Feb. 4, 1969 M. ZUNINO ET AL 3,425,350
PRE-ESTABLISHED SPLINTERING SHELL
Filed March 27, 1967 Sheet 1 of 6
Fig. 1
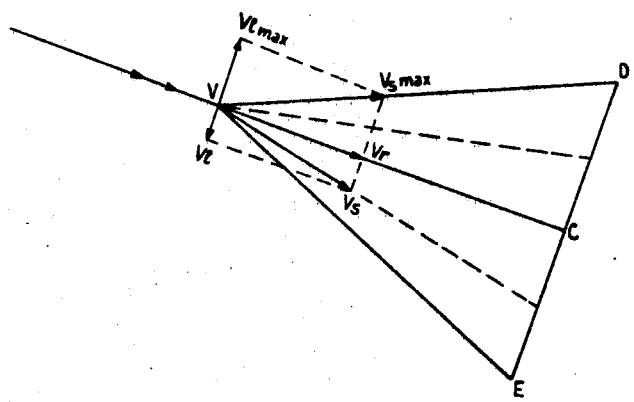
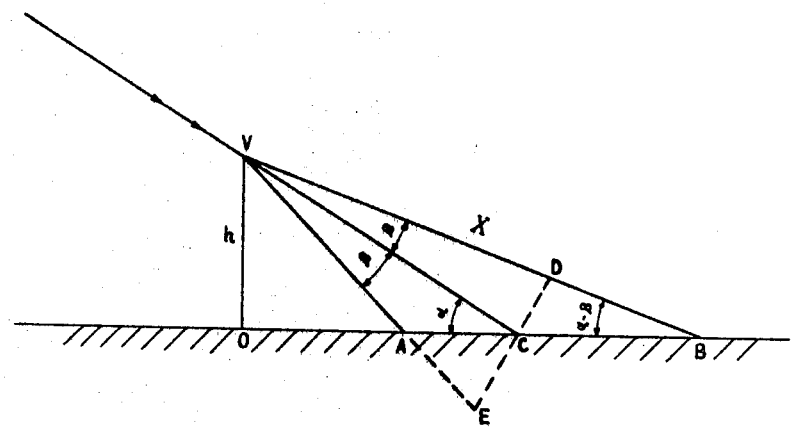
Fig. 2

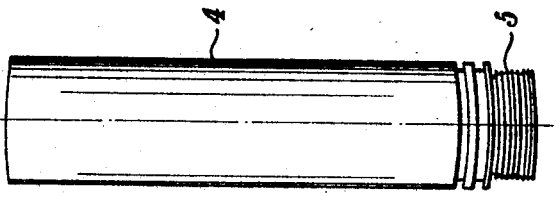
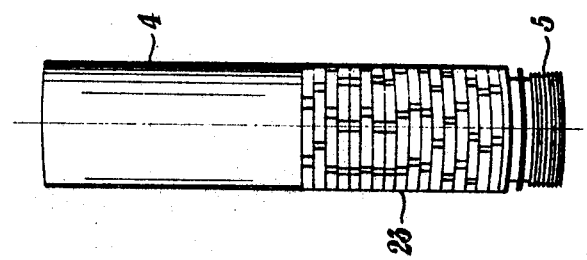
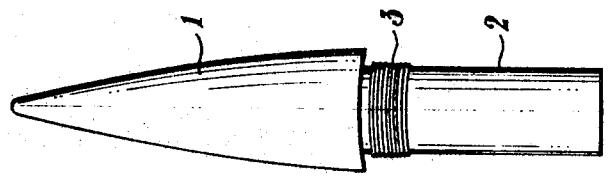

United States Patent Office 3,425,350
Patented Feb. 4, 1969

3,425,350
PRE-ESTABLISHED SPLINTERING SHELL
Mario Zunino and Giannino Corsi, Rome, and Francesco Sammartino, Colleferro, Italy, assignors to Bombrini Parodi-Delfino S.p.A., Rome, Italy
Filed Mar. 27, 1967, Ser. No. 626,135
Claims priority, application Italy, Apr. 9, 1966, 7,917/66
U.S. Cl. 102—67                      10 Claims
Int. Cl. F24b 13/48

ABSTRACT OF THE DISCLOSURE

A shell including a fuse the base of which contacts a directioned booster, a first set of metal rings located about the fuse, a second set of metal rings occupying the entire cross-sectional area of the shell, and detonating elements in order to cause the pre-established break of said rings.

---

The present invention relates to a pre-established splintering shell.

More particularly the present invention relates to a pre-established splintering shell suitable to provide, at its burst, a splinter cone complying with the requisites as follows:

(a) Angle of the cone ($2\beta$) not greater than a determined maximum value;

(b) Splinters uniform with one another (or groups of splinters uniform with one another);

(c) Uniform distribution of the splinters onto the area of the circle forming the right cross section of the cone at the crossing point of its axis with the target;

(d) A density of distribution of the splinters onto said area not lesser than a determined value.

The splintering shells generally operated by percussion fuses, i.e., by fuses which determine the shell to burst when striking the ground or the target are known. Also known are the fuses controlling the burst at a certain point of the trajectory, before impact.

The last cited fuses take up generally a remarkable volume inside the shell, whereby if such a fuse is to be coupled to a pre-established splintering shell, various technical problems occur, and among them those concerning the occupied space, particularly in case of reduced caliber shells (for instance 40 to 80 mm.). In other words, the free space required by the fuse determines a remarkable reduction of the available space, for the active elements (splinters deriving from a pre-established splintering) whereby, particularly in the small calibers, a reduction of the shell efficacity will be obtained.

The purpose of this invention is that of embodying a shell of the concerned kind, wherein the aforesaid shortcomings are eliminated. This purpose is attained by adopting metal rings as pre-established splintering elements.

According to this invention, a shell is provided having a fore fuse the part of which located inside the shell has a cylinder shape and the lower end of which contacts a "booster" which could be also incorporated within said cylindrical part, a set of pre-established splintering metal rings superposed to one another and fit on said cylindrical part, a plurality of detonating elements arranged parallel to the axis of the shell, and received within the recesses provided in said rings, a second set of pre-established splintering metal rings, aligned with the previously cited rings, a detonating element for the last cited rings, located in axial position, and a priming ring for said detonating elements, interposed between said two sets of splintering rings.

This invention will be now described with reference to the attached drawings, showing by way of nonlimitative example, one preferred embodiment of the invention.

In the drawings:

FIGURES 1 and 2 show two diagrams concerning the theoretical discussion of the shell according to this invention;

FIGURE 3 shows a side elevational view of a proximity fuse;

FIGURES 4 and 5 show the shell body removed from the fuse, in two embodiments with partial coating and with total coating, respectively;

Figure 6:
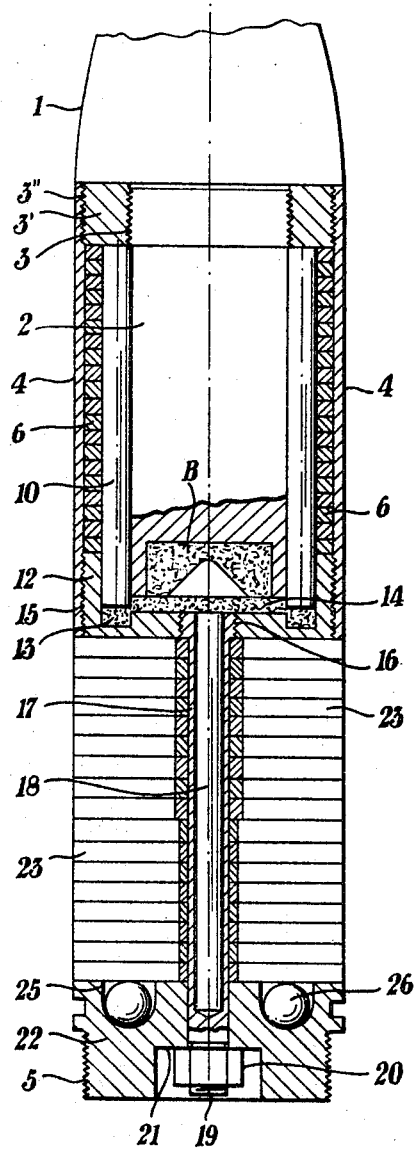
FIGURE 6 is a cross sectional view of the shell.

A war action against transport of troops, or troops scattered on a ground zone having a certain width can be successfully made also by aircraft provided with rockets provided with "pre-established splintering shells" responding to particular requirements and the operation of which is controlled by a device (either proximity fuse, or other fuse of suitable type), causing the shell to burst at a regular and determined height above the ground.

At the burst point, the shell will have to splinter decomposing in a prefixed number of well defined splinters. Each single splinter already provided (FIGURE 1) with the velocity $V_r$ which the rocket had at the burst point (V) (directed along the tangent at said point to the rocket trajectory), takes at that point, its own velocity $V_s$ resultant from the composition of $V_r$ with the lateral velocity $V_l$ perpendicular to $V_r$, imparted to the splinters by the splintering explosive. The trajectory followed by the splinter will have originally the direction of $V_s$.

All splinters having equal weight and velocity $V_s$ will have theoretically their trajectories lying on the lateral surface of a cone, the semiangle of which ($\beta$) is given by: $\tan \beta = V_l/V_r$.

If the value of $V_l$ is variable from one splinter to another (or group of splinters), to its maximum value $V_l$ max., a maximum cone angle will correspond, given by $$\tan \beta = V_l \text{ max.}/V_r$$

Therefore all splinters will have their trajectories included in a cone the angle of which $2\beta$ will correspond to the maximum value of the velocity $V_l$ imparted to the splinter by the splintering explosive.

In order to obtain for all splinters, in their unit, the maximum "deadly efficiency" said splinters must comply with the requisites as follows (FIGURE 1):

(a) The weight must be uniform for all splinters;

(b) The splinters must be distributed as uniformly as possible throughout the area of the circle having the $\overline{DE}$ diameter, i.e., the right cross-section of the "splinter cone" at the point C where its axis (trajectory of the rocket) meets the target;

(c) Further the density of distribution through the area of the circle $\overline{DE}$ must not be lower than a determined value (generally established by $c = 1 \div 1.6$);

(d) The vulnerable power must be corresponding to a kinetic power $E_u$ when striking the target, in no case lower than a determined value $E_u = \frac{1}{2} m V_u^2$ ($m$ being the mass of the splinter, and $V_u$ the residual speed at the end of the trajectory). The maximum value of $E_u$ in case of troops in extended order, can be established in 16÷19 kgms.

Therefore, the impact speed $V_u$ must be in any case $V_u \geq \sqrt{2E_u/m}$, and its minimum value will occur for those splinters which will have (FIGURE 2) the maximum path $X=VB$ from the burst point (V) to the ground.

Said maximum path is a function:

Of the firing angle of the aircraft ($\alpha$),
Of the height of burst above the ground ($h$),
Of the value of the semiangle of the splinter cone ($\beta$) and will be: $X$ max.$=h/\sin(\alpha-\beta)$.

The value $X$ max.$=\overline{VB}$ must be therefore pre-established so as to correspond to a minimum value $$V_u = \sqrt{2E_u/m}$$

From suitable "resistance tables" giving $V_u$ versus $V_s=$ initial speed of the splinter (or of $V_r$) and of its path X, the value X max. related to said $V_u$ minimum will be obtained.

On the basis of the value determined as aforesaid, of X max.; and known the pre-established values concerning the firing angle of the aircraft ($\alpha$) and height of burst above the ground ($h$), in the basis of $$\sin(\alpha-\beta) = X \text{ max.}/h$$

will be defined the maximum value of the semiangle of the cone of splinters ($\beta$) to be embodied due to splintering of the shell, said value depending upon a *maximum value* of the lateral speed of the splinters, and ought *not to be overcome owing to the splintering effect of the explosive*.

The practical embodiment of the above listed conditions is sometimes rendered more difficult by the need of adopting fuses which need a very remarkable free space inside the shell (proximity fuses or the like) determining a reduction of the efficacy of the shell and this particularly in the small caliber shells (for instance 40 to 80 mm.).

This drawback does not exist generally for the pre-established splintering shells the burst of which is determined by the impact on the ground or against a target by a percussion fuse.

The above indicated shortcomings are obviated and the required requisites are embodied by the pre-established splintering shell according to the present invention.

The specification of the pre-established splintering shell as hereinafter disclosed, and the reference drawings concerning the present invention, are based on a practical embodiment, made and tested, of a pre-established splintering shell having a proximity fuse.

The disclosure concerning such a kind of shell constitutes no limitation for any other caliber.

With reference to FIGURES 3 and 4, the fuse, denoted generally by the reference numeral 1, is provided with a cylindrical tail 2 having a screw threaded portion 3 which is engaged with the internal thread of the fuse connecting ring 3', while the outer thread 3" of said ring serves the purpose of fastening the upper end of the coating 4. The cylindrical end of the fuse rests on a booster B for priming the explosive compressed in the priming ring of the detonating elements 12. This booster can be incorporated in the fuse. In FIGURE 4 the coating 4 covers only part of the shell, leaving uncovered a set of splintering rings 23, while in the different embodiment shown in FIGURE 5 and said coating 4 covers the whole length of the shell.

Figure 7:
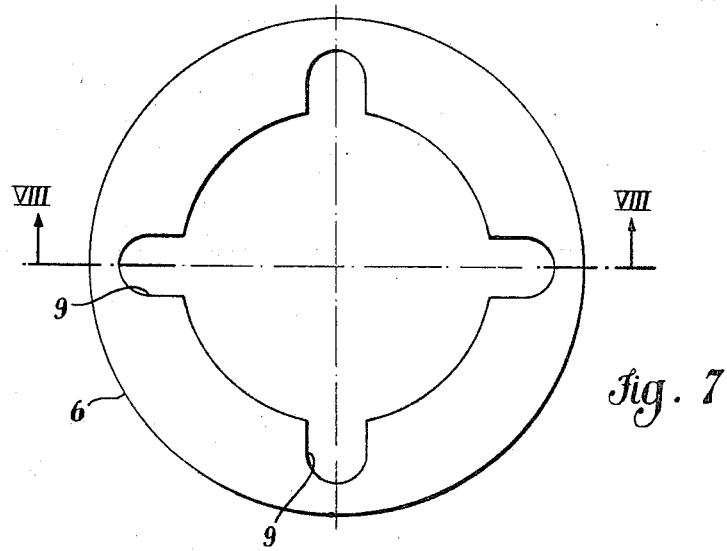
FIGURE 7 shows a splintering ring, in top plane view.
Figure 8:
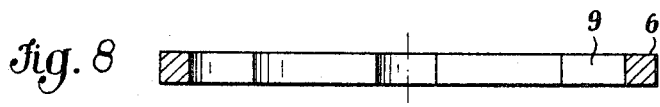
FIGURE 8 is a cross sectional view taken along the plane VIII—VIII of FIGURE 7.
Figure 9:
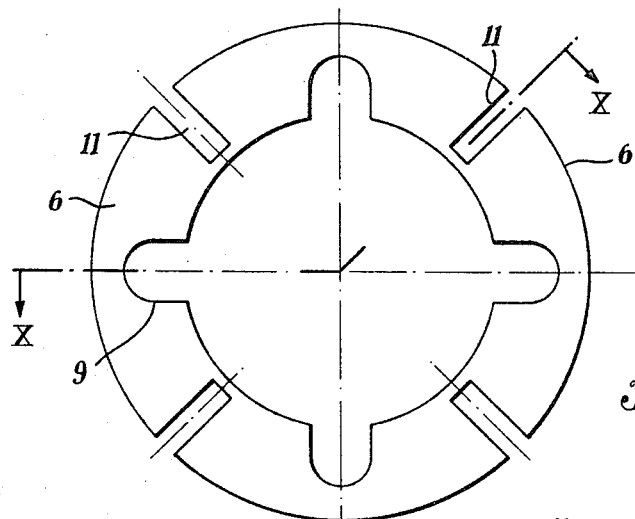
FIGURE 9 shows a modification of the ring of FIGURE 7.
Figure 10:
FIGURE 10 is a cross sectional view taken along the plane X—X of FIGURE 9.

About the cylindrical part 2, of the fuse (FIGURE 6) are located the pre-established splintering metal rings 6 (FIGURES 7 and 8) provided with the recesses 9 located equispaced through 90°; into which there are located the detonating elements 10 (either detonating match or the like) which communicate at their base with the ring 12 for priming the detonating elements, as will be better explained later on. The booster B is shaped so as to cause a directioned burst. As shown in FIGURES 7 and 8, the rings 6 are destined to decompose each into four splinters. In a modification (FIGURES 9 and 10) it is possible to provide the notches 11 in order to obtain eight splinters for each ring.

Figure 12:
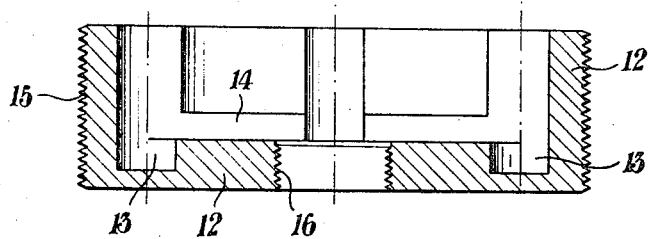
FIGURES 12 and 13 are the cross sectional views taken along the planes XII—XII and XIII—XIII respectively.
Figure 11:
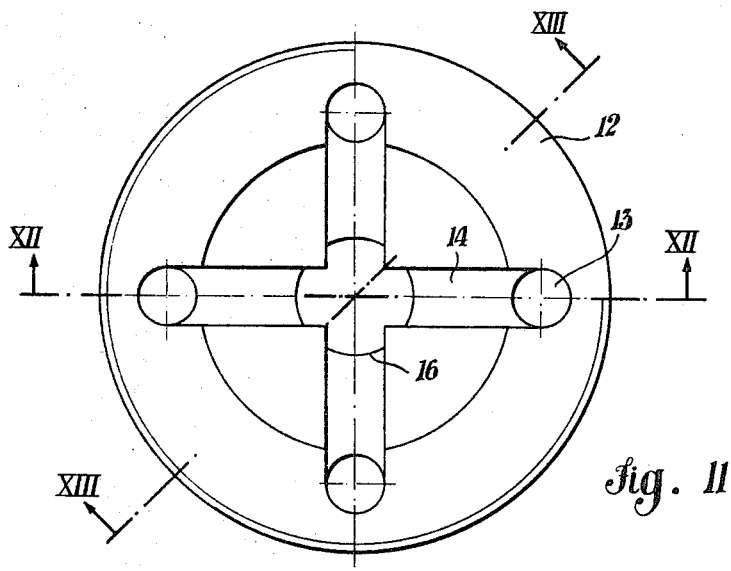
FIGURE 11 shows the detail of the priming ring.
Figure 13:
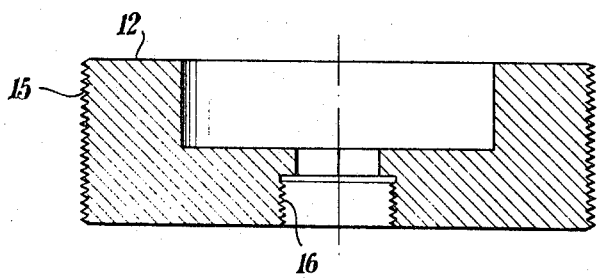

At the base of the group of splintering rings 6 (FIGURE 6) a priming ring 12 (see also FIGURES 11, 12 and 13) is located, provided with four recesses 13 corresponding to the base of the detonating elements 10 and connected by cross shaped grooves 14. Said recesses 13 and the grooves 14 are filled with compressed priming explosive. The ring 12 is provided with an outer thread 15 in which is screw threaded the corresponding lower inner thread of the coating 4 so as to keep connected all the parts described up to now. At the centre of the ring 12, there is provided a threaded hole 16 wherein a hollow tubular stem 17, containing an axial detonating element 18 is screwed the upper end of which contacts the aforementioned priming explosive.

Figure 14:
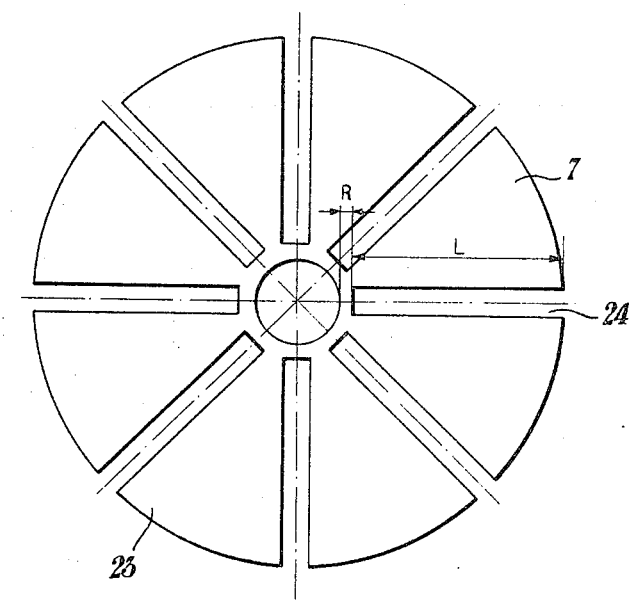
FIGURES 14 and 15 show another kind of splintering ring, in top plane view and in side elevational view, respectively.
Figure 15:
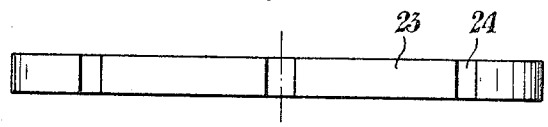

The hollow stem 17 terminates at its base with a threaded extension 19 whereon is tightened the nut 20 resting on the seat 21 provided in the bottom 22. Between the bottom 22 and the ring 12 a plurality of splintering rings 23 are tightened, as shown in FIGURES 14 and 15. Said rings 23 are subdivided in eight sectors or splinters, by means of radial cuts 24. The length L of said cuts can determine variable values of the "splintering zone" R. In FIGURE 6 have been shown, for the rings 23, two different values of the "splintering zone" R, a greater value for the upper group of rings, and a minor value for the underlying rings.

The bottom 22 is provided with a toroidal seat 25 wherein are located the lead shots 26, and an outer thread 5 for fixing the shell to the motor of the rocket.

The operation is as follows: at the prefixed height above the ground, the fuse 1 causes the booster B to operate, and therefore the priming of the explosive compressed in the cross grooves 14 of the ring 12 and then in its recesses 13. Said explosive, in turn, causes the simultaneous priming of the four detonating upper lateral elements 10 and of the lower central element 18. The four detonating elements 10 cause, in correspondence with their contact with the splintering rings 6, the total longitudinal cut of the coating 4 along four generatrices equispaced through 90° from one another, and the break of the rings 6 into splinters having equal shape and weight to one another.

The central detonating element 18, in turn, cuts the wall of the tubular stem 17 and determines the break of each of the rings 23 into eight splinters, freeing also the shots 26 located in the bottom 22.

The present invention has been described in a preferred embodiment, being however understood that executive variations could be practically adopted without departing from the scope of the present industrial privilege.

We claim:

1. A pre-established splintering shell comprising a fore fuse having an ogive and a cylindrical part, a booster charge located at the base of said cylindrical part to cause a directioned burst, a first set of superposed pre-established break metal rings fitted on said cylindrical part having detonating element seats, a plurality of upper detonating elements located parallel to the longitudinal axis of said shell located in said seats, a second set of pre-established break metal rings located behind said first set, a detonating element for said second set located along the axis of said shell, and a priming ring for said detonating elements located between said two sets of break rings.

2. A shell as claimed in claim 1 wherein said seats define the break zones of said first set of rings.

3. A shell as claimed in claim 1 wherein said priming ring has a set of seats located at the base of said upper detonating elements, and a seat cooperating with said detonating element for said second set of rings to determine the simultaneous priming of said detonating elements.

4. A shell as claimed in claim 1 wherein said second set of rings has a central hole and said detonating element for said second set of rings is contained in a tubular hollow stem passing through said hole.

5. A shell as claimed in claim 1 wherein said second set of rings comprises metal discs provided with radial cuts having a length to define variable values of the break zone.

6. A shell as claimed in claim 4 wherein said tubular stem is provided at its lower end with a threaded extension having a nut screwed thereon to hold said rings and detonating elements assembled.

7. A shell as claimed in claim 4 wherein a bottom element is provided for said second set of break rings and said second set of rings is tightened between said bottom element and said priming ring and the upper end of said tubular stem is secured to said priming ring.

8. A shell as claimed in claim 7 wherein said bottom element is provided with a toroidal groove and a plurality of metal shots are located in said groove.

9. A shell as claimed in claim 1 wherein said first set of break rings is covered by a cylindrical coating secured to said fuse and said priming ring.

10. A shell as claimed in claim 9 wherein said coating extends from said fuse to the bottom of said second set of rings.

References Cited
UNITED STATES PATENTS

| | | | |
|---|---|---|---|
| 1,244,046 | 10/1917 | French | 102—67 |
| 1,325,706 | 12/1919 | Todisco | 102—67 |
| 2,798,431 | 7/1957 | Semon et al. | 102—67 |

BENJAMIN A. BORCHELT, *Primary Examiner.*

GERALD H. GLANZMAN, *Assistant Examiner.*